United States Patent Office 3,301,935
Patented Jan. 31, 1967

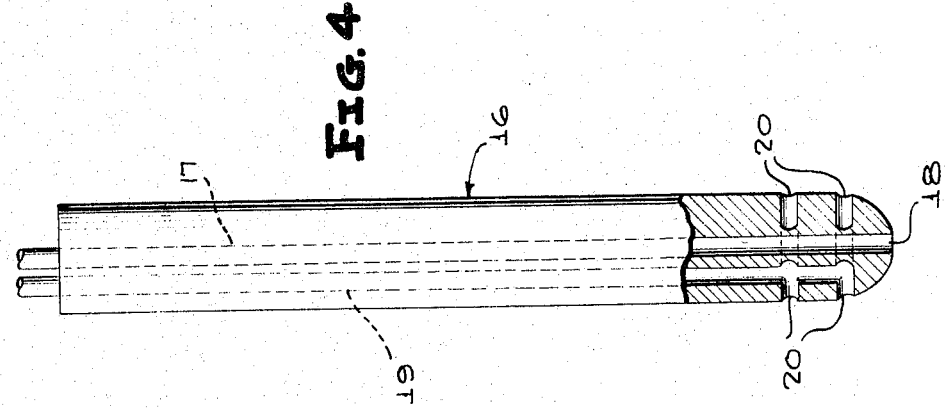
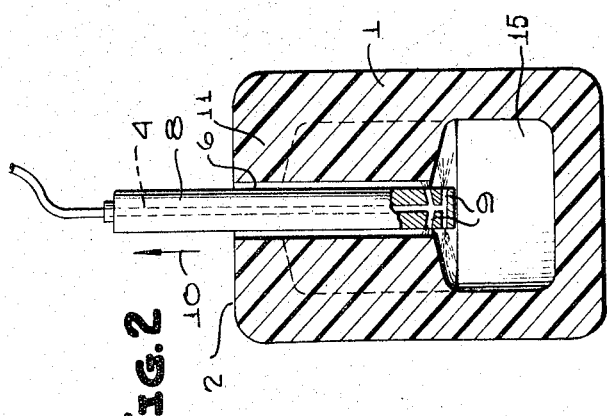
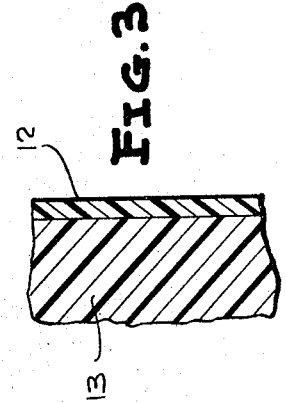
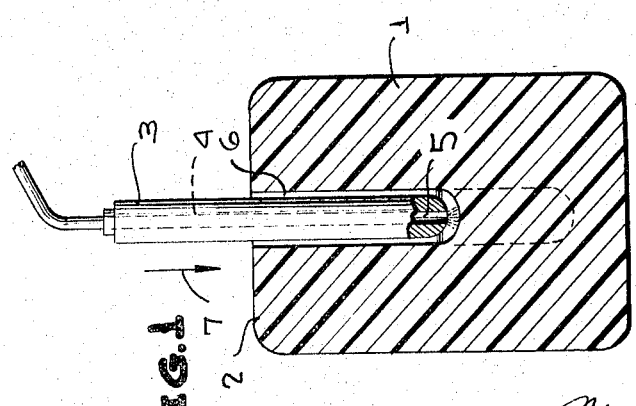

3,301,935
PROCESS FOR THE FORMING OF SHAPED ARTICLES OF THERMOPLASTIC FOAM MATERIAL
Klaus Stoeckhert, Braunschweig, Germany, assignor to Continental Can Company, Inc., New York, N.Y., a corporation of New York
Filed Sept. 28, 1962, Ser. No. 226,913
8 Claims. (Cl. 264—321)

This invention concerns a process for forming shaped articles from expandable thermoplastic foam materials with closed cells such as, for example, polystyrol, polyvinyl chloride, polyethylene, cellulose acetate, etc.

Shaped articles of foam plastic find application in the many diverse branches of industry and trade. For example, foam plastics are used in the packaging industry for embedding shock-sensitive goods or as insulators against heat or cold, and also as direct packaging containers for cosmetic articles, silverware, jewelry, bottled goods and the like beyond its use as fill or lining material where the advantages of these foam plastics, such as their low weight, good appearance, printability, paintability and coatability are used to advantage.

The shaped foam plastic articles are, when possible, so formed during manufacture so that further changes in the outside dimensions are no longer required. If, however, subsequent shaping is required, then this as a rule only occurs in three ways: (1) Shaving off material, such as by lathes, drilling, or the like; (2) by sawing; (3) by the hot (glowing) wire process. The last process is based on pressing the foam plastic in contact with a heated glowing wire which is most cores is electrically heated. The contact zone is then burned out, as the resultant odor of fractioning and decomposition products clearly indicates, and this results in a more or less smooth separation surface.

All three of the above named processes, however, have disadvantages. For example, a not negligible waste occurs with the shaving process. Only plane surface separation surfaces are possible by sawing, and the glowing-wire process is limited because of geometrical reasons.

Now it was found that deformations and also separations of such thermoplastic foam plastics are possible without the contact of any material removing tools or the like, if energies and/or substances are caused to act on these foam plastics which cause the foam structure to shrink at those points of effect. The foam material caused to shrink contracts to a glaze-like layer without foam structure and protects the remaining foam structure by sealing it like a lacquer. Thereafter it is possible to bring the thus shaped glaze-like surface of the foam plastic in contact with media, such as liquids for example, which would normally enter into the structure of the foam material with the normal porous structure. Because the glaze-like surface is limited in depth as well as in surface extent to the area of the immediate effect of the energy and/or substance, the characteristic qualities of the foam material remain the same with respect to the entire article.

Because the cells of the foam plastic are still under pressure from the original production, and because the thin walls between cells have a tendency to draw together into a massive layer as soon as the material has been softened sufficiently, the foam structure can be caused to shrink in two ways, according to this invention. In the one case by the effect of heat, either in the form of hot gases or vapors or radiant heat, and in the other case by the effect of solvents or softening-material vapors, at room temperature or slightly higher temperatures. In the first case, only the softening point of the plastic need be reached, and not, as in the known glowing-wire process, the decomposition point. Treatment according to the second manner is based on the known fact that synthetics softened by solvents and the like behave like the same plastics at increased temperatures without the effect of the solvents. It is characteristic in both process steps that any kind of mechanical treatment of the synthetic is unnecessary. In order to improve the surface of the foam plastic caused to shrink, the surface may be subsequently compacted and smoothed in a well known manner by subsequent pressing the same with heated surfaces, if required.

A further consideration of this invention consists of applying the above described process in the production of hollow bodies open on at least one side from foam plastics. According to the invention one would proceed that, by means of energy and/or material currents (streams) directed at, for example, rectangular foam blocks with the energy and/or material entering these blocks and forming hollow space. According to further characteristics of this invention, the depth of this hollow space can be controlled either by the spacing or by the intensity of the directed energy and/or material streams. The hollow space can be enlarged entirely or partially, if desired, by radially directed energy and/or material streams.

With the above and other objects in view that will hereinafter appear, the nature of the invention will be more clearly understood by a reference to the following detailed description, the appended claims and the several views illustrated in the accompanying drawing.

In the drawing:

FIGURE 1 is a vertical sectional view through a thermoplastic foam article in accordance with this invention with a blowing jet in place to produce a hollow space within the article.

FIGURE 2 is a vertical sectional view through another thermoplastic foam article wherein a special blowing jet is disposed to enlarge the hollow space within the article.

FIGURE 3 is an enlarged fragmentary vertical sectional view taken through a hollow article treated in accordance with this invention and shows the details of the treated wall.

FIGURE 4 is an elevational view with parts broken away and shown in section of still another form of blowing jet.

Referring now to the drawing in detail, reference is first made to FIGURE 1 wherein there is illustrated a shaped article 1 which is formed of a thermoplastic foam material. A blowing jet 3 is directed against one face of the article 1, such as the upper face 2 of the article 1. The blowing jet is in the form of a tube having an axial passage 4 extending therethrough and opening through the projecting end of the blowing jet, as at 5 in the form of a jet opening. The energy and/or material stream guided through the jet 3, for example, a hot steam or a suitable solvent, is directed against the material of the article 1 as it leaves the jet opening 5. On contacting the surface of the article 1, the jet stream produces a hollow space 6 the depth of which can be controlled by either the intensity of the jet stream or by the gradual lowering of the blowing jet 3 into the hollow space 6. The inward movement of the blowing jet clearly is indicated by the arrow 7.

If, after the hollow space 6 has been formed, it is desired to enlarge the hollow space 6 to produce, for example, the inside of a bottle, then the blowing jet 3 is removed and replaced by a blowing jet 8 which is inserted into the hollow space 6. The blowing jet 8 is disposed substantially entirely within the hollow space 6, after which the blowing jet 8, unlike the blowing jet 3, is provided with radial jet openings 9. After the blowing jet 8 has been lowered into the space 6, an energy and/or material stream is guided through the blowing jet 8 and out through the radial jet openings 9. Simultaneous with the operation of the blowing jet 8, the blowing jet is lifted in the direction of the arrow 10. The upward movement of the blowing jet 8 continues until the upper end of the desired hollow space is reached, at which time the operation of the blowing jet 8 is discontinued and is completely withdrawn from within the article 1.

In accordance with the showing of FIGURE 2 wherein it is desired to form a container, the enlarged space formed by the blowing jet 8, which space is referred to by the numeral 15, is of a nature to leave a short narrow portion of the original hollow space 6 so as to define a neck 11.

Reference is now made to FIGURE 3 wherein there is shown a section of the wall of the article 1 which has been treated in accordance with the foregoing. The wall has a surface layer 12 which has sustained the immediate effect of the energy and/or material stream with the result that the foam structure has shrunk and a glaze-like smooth wall has been provided. On the other hand, the cellular structure 13 lying behind the layer 12 remains unchanged and the desired foam qualities of the article 1 remain the same.

Reference is now made to FIGURE 4 wherein there is illustrated a blowing jet 16 having an axial passage 17 therethrough. The passage 17 extends entirely through the blowing jet 16 and terminates at the bottom thereof in an axial jet opening or orifice 18. The blowing jet 16 also has a passage 19 therethrough which is connected to a plurality of radial passages, the radial passages opening through the peripheral surface of the blowing jet 16 in the form of radially opening jet orifices 20. Suitable valve means (not shown) will be provided for controlling the flow through the passages 17 and 19. Utilizing the blowing jet 16, a space similar to the space 6 may be formed during the downward movement of the blowing jet 16 and the space enlarged during the upward movement of the same blowing jet.

Experiments have been carried out in accordance with this invention and it has been found that many expandable thermoplastic materials with glazed cells may be treated or shaped in accordance with this invention. These thermoplastic materials include, among others, polystyrol, polyvinyl chloride, polyethylene and cellulose acetate.

In utilizing the blowing jets, hot air or gases or hot water vapor may be forced through the blowing jets. The applicable operating temperatures for the hot air and gases and the hot water vapor range between 100° C. and 200° C. On the other hand, when solvent vapors are utilized, these may need not be hot and generally must not be hot. It is to be understood that all solvent vapors will work for all types of thermoplastic materials. Examples of suitable solvent vapors and the thermoplastic materials with similar functions are as follows:

| Thermoplastic materials: | Solvent vapors |
|---|---|
| Polystyrene and cellulose acetate | Ketones, esters and ethyl acetate. |
| Polyvinyl chloride | Aromatic hydrocarbons, such as benzene or tetrahydrofurane. |
| Polyethylene | Aliphatic hydrocarbons such as hexane or heptane. |

It is to be understood that minor modifications may be made within the spirit and scope of the invention, as defined in the appended claims.

What is claimed is:
1. A process of forming a one-piece hollow body from a body of cellular-thermoplastic foam material which comprises subjecting at least one surface of said body of foam material to a fluid-stream of softening agent from a blowing jet; continuing said stream against the surface of the foam material until the cells thereof shrink to form a hollow; said hollow characterized as having a non-porous skin-like surface and said softening agent being selected from the group consisting of steam, hot gases and vapors of an organic solvent.
2. The process of claim 1 further characterized in that the hot gases comprise hot air.
3. The process of claim 1 further characterized in that the vapors are of an organic solvent selected from the group consisting of aromatic hydrocarbons, aliphatic hydrocarbons, ketones and esters.
4. The process of claim 1 further characterized in that the softening agent is steam having a temperature ranging from about 100°–200° C.
5. The process of claim 1 further characterized in that the body of cellular-thermoplastic foam material is selected from the group consisting of polystyrene, cellulose acetate, polyvinylchloride and polyethylene.
6. The process of claim 1 further characterized in that the depth of the hollow in the body of cellular-thermoplastic foam material is determined by the spacing of the blowing jet from said body of foam material and the intensity of the fluid stream of softening agent coming from said blowing jet.
7. The process of claim 1 further characterized in that simultaneously with directing the fluid-steam of softening agent from the blowing jet against the body of the foam material, said jet is inserted into the hollow as it is formed; said insertion and fluid-stream of softening agent being continued to a desired depth; subsequently withdrawing said blowing jet from said hollow while directing radial streams of the softening agent against the walls of the hollow to effect shrinkage of the cells and thereby increase the cross-section of the hollow.
8. The process of claim 7 further characterized in that the radial streams of softening agent from the blowing jet are discontinued before said jet is completely removed from said hollow in the body of foam material.

References Cited by the Examiner
UNITED STATES PATENTS

| | | | |
|---|---|---|---|
| 2,049,575 | 8/1936 | Sutton | 148—9 |
| 2,407,972 | 9/1946 | Aitchison | 148—9 XR |
| 2,577,550 | 12/1951 | Wahlin | 299—141 |
| 2,593,096 | 4/1952 | Brusdale | 299—141 |
| 2,595,964 | 5/1952 | Lovell | 264—50 XR |
| 2,685,319 | 8/1954 | Swasko | 220—9 |
| 2,722,719 | 11/1955 | Alstadter | 264—321 XR |
| 2,763,759 | 9/1956 | Mito et al. | 264—154 |
| 2,767,436 | 10/1956 | Noland et al. | 264—321 |
| 2,926,389 | 3/1960 | Garlington | 264—54 XR |
| 2,948,430 | 8/1960 | Teague et al. | 220—9 |
| 2,957,793 | 10/1960 | Dickey | 156—497 |
| 3,002,248 | 10/1961 | Wilson | 25—45 |
| 3,012,918 | 12/1961 | Schaar | 264—154 |
| 3,061,885 | 11/1962 | Rogers et al. | 18—48 |
| 3,071,279 | 1/1963 | Bruce | 220—1 |
| 3,123,656 | 3/1964 | Rochlin | 264—321 |
| 3,130,252 | 4/1964 | Metz | 148—9 XR |

(Other references on following page)

FOREIGN PATENTS 890,506   2/1962   Great Britain.

OTHER REFERENCES

McCuaig, D. W.: "An expanded polystyrene." In Modern Plastics, March 1945, pp. 106–109, 202.

Stastny, Fritz: "New Methods for the Fabrication of Styropor," pp. 23–24 (in BASF booklet reprinted from Der Plastverarbeiter, 7, 242–250 (all pages) (1955).

DONALD J. ARNOLD, *Primary Examiner.*

THERON E. CONDON, *Examiner.*

R. A. JENSEN, P. E. ANDERSON,
              *Assistant Examiners.*